(12) United States Patent
Leung

(10) Patent No.: US 8,718,718 B2
(45) Date of Patent: May 6, 2014

(54) POWER WIFI DEVICE

(76) Inventor: Alan Siu Kit Leung, Hong Kong (HK)

( * ) Notice: Subject to any disclaimer, the term of this patent is extended or adjusted under 35 U.S.C. 154(b) by 256 days.

(21) Appl. No.: 13/425,381

(22) Filed: Mar. 20, 2012

(65) Prior Publication Data

US 2013/0254560 A1  Sep. 26, 2013

(51) Int. Cl.
*H04B 1/38* (2006.01)

(52) U.S. Cl.
USPC .......................... 455/573; 455/572; 455/343.1

(58) Field of Classification Search
USPC ............... 455/572, 573, 343.1; 320/127, 134, 320/136, 137, 141
See application file for complete search history.

(56) References Cited

U.S. PATENT DOCUMENTS

| 8,527,688 B2 * | 9/2013 | Chatterjee et al. | 710/303 |
| 2004/0251878 A1 * | 12/2004 | Veselic | 320/141 |
| 2011/0309145 A1 * | 12/2011 | Richardson et al. | 235/435 |

* cited by examiner

*Primary Examiner* — Manpreet Matharu

(57) ABSTRACT

A power WiFi device includes an AC sharing module, including a plurality of AC outlets and being configured to receive an AC input from an AC power supply and distribute the power through the AC outlets; an AC/DC converter being connected to the AC sharing module and configured to convert the AC input to an DC voltage; a DC voltage regulator being connected to the AC/DC converter and an external DC power supply, and being configured to regulate the DC voltage from the AC/DC converter and an external DC input; a cellular network interface being connected to the DC voltage regulator and configured to establish a network connection to a cellular network; an Ethernet interface being connected to the cellular network interface and configured to share the network connection; and a wireless network being connected to the cellular network interface and configured to share the network connection.

20 Claims, 6 Drawing Sheets

POWER WIFI DEVICE

FIELD OF THE PATENT APPLICATION

The present patent application relates to portable electronic devices and more particularly to a power WiFi device that provides power management and wireless data connectivity all driven primarily by mobile applications.

BACKGROUND

With the development of the Internet and mobile computing, more and more people are accessing Internet in mobile settings. For example, by using a SIM (Subscriber Identity Module) card, people can get online through a cellular network provided by a telecommunication provider. Devices such as MiFi, or mobile WiFi, have been designed to share the Internet connection enabled by the SIM card with up to a certain number of WiFi devices. The MiFi works at distances up to 10 m (30 ft) and is configured to provide Internet access to any WiFi enabled device within the range. In some cases, people may further need to share an Internet access between a cellular connection, an Ethernet interface (for example through a RJ45 connector), and a WiFi network.

At the same time, with so many mobile devices today, people frequently need to charge these devices on the go. Some mobile devices, because of their relatively higher working power, require high power charging (typically over 10 watts), while some other mobile devices do not. It is essential to charge the mobile devices with the appropriate power settings that match their specific charging profiles. Therefore, especially for people who work in mobile settings, it is desired to provide a mobile device that enables wireless data connectivity as well as power management, and can be easily configured to fit specific user requirements and device conditions.

SUMMARY

The present patent application is directed to a power WiFi device configured for running an application. In one aspect, the power WiFi device includes an AC sharing module, the AC sharing module including a plurality of AC outlets and being configured to receive an AC input from an AC power supply and distribute the power through the AC outlets; an AC/DC converter being connected to the AC sharing module and configured to convert the AC input to an DC voltage; a DC voltage regulator being connected to the AC/DC converter and an external DC power supply, and being configured to regulate the DC voltage from the AC/DC converter and an external DC input supplied from the external DC power supply; a cellular network interface being connected to the DC voltage regulator and configured to establish a network connection to a cellular network; an Ethernet interface being connected to the cellular network interface and configured to share the network connection; and a wireless network being connected to the cellular network interface and configured to share the network connection.

The power WiFi device may further include a DC/AC inverter being connected to the AC sharing module and the DC voltage regulator, and configured to convert an output of the DC voltage regulator to an AC voltage and to feed the AC voltage to the AC sharing module to be distributed through the AC outlets. The AC sharing module may be configured to receive AC voltage input of multiple values.

The power WiFi device may further include a rechargeable battery module being connected to the DC voltage regulator, and configured to be recharged by an output voltage of the DC voltage regulator and to input a battery DC voltage to the DC voltage regulator. The external DC power supply may be a cigarette lighter and the external DC input may be a standard cigarette lighter receptacle DC voltage.

The power WiFi device may further include a USB charging module being connected to the DC voltage regulator and configured to charge USB devices. The USB charging module may include two data pins and the voltages on the two data pins may be programmable so as to fit a specific charging profile.

The resistor values on the two data pins may be altered via an electronic resistor network or voltage pulse width modulation. The data pins may be shorted so as to indicate to a device connected to the USB charging module that the USB charging module is for high power charging.

The power WiFi device may further include an embedded CPU module being connected to the DC voltage regulator and configured to run the application. The wireless network may be configured to function as a medium for the power WiFi device to communicate with a handheld device that stores the application.

The power WiFi device may further include a device controller being connected to the DC voltage regulator and configured to provide control for the power WiFi device. The device controller may include a plurality of switches and LEDs. In choosing a power source to power the power WiFi device, the device controller may be configured to give higher precedence to the AC power supply than the external DC power supply, and give higher precedence to the external DC power supply than the rechargeable battery module. If the rechargeable battery module is used to power the WiFi device when the AC input is not available, when the AC input is available, the rechargeable battery module may be configured to be recharged by the output voltage of the DC voltage regulator until the rechargeable battery module is fully recharged.

The plurality of AC outlets of the AC sharing module may be configured to output different AC voltages.

In another aspect, the power WiFi device includes an AC sharing module, the AC sharing module including a plurality of AC outlets and being configured to receive an AC input from an AC power supply and distribute the power through the AC outlets; an AC/DC converter being connected to the AC sharing module and configured to convert the AC input to an DC voltage; a DC voltage regulator being connected to the AC/DC converter and an external DC power supply, and being configured to regulate the DC voltage from the AC/DC converter and an external DC input supplied from the external DC power supply; a cellular network interface being connected to the DC voltage regulator and configured to establish a first network connection to a cellular network; an Ethernet interface being connected to the DC voltage regulator and configured to establish a second network connection to an existing network; and a wireless network being connected to the cellular network interface and the Ethernet interface and configured to share the first network connection with the cellular network interface or share the second network connection with the Ethernet interface.

When both the first network connection and the second network connection are available, the wireless network may be configured to share the second network connection with the Ethernet interface.

The power WiFi device may further include a rechargeable battery module and a device controller. The rechargeable battery module may be connected to the DC voltage regulator and configured to be recharged by an output voltage of the DC voltage regulator and to input a battery DC voltage to the DC voltage regulator. The device controller may be connected to the DC voltage regulator and configured to give higher precedence to the AC power supply than the external DC power supply, and give higher precedence to the external DC power supply than the rechargeable battery module in choosing a power source to power the power WiFi device.

If the rechargeable battery module is used to power the WiFi device when the AC input is not available, when the AC input is available, the rechargeable battery module may be configured to be recharged by the output voltage of the DC voltage regulator until the rechargeable battery module is fully recharged.

The power WiFi device may further include a USB charging module being connected to the DC voltage regulator and configured to charge USB devices. The USB charging module may include two data pins and the voltages on the two data pins may be programmable so as to fit a specific charging profile.

The wireless network may be configured to function as a medium for the power WiFi device to communicate with a handheld device that stores the application.

In yet another aspect, the power WiFi device includes an AC sharing module, the AC sharing module including a plurality of AC outlets and being configured to receive an AC input from an AC power supply and distribute the power through the AC outlets; an AC/DC converter being connected to the AC sharing module and configured to convert the AC input to an DC voltage; a DC voltage regulator being connected to the AC/DC converter and an external DC power supply, and being configured to regulate the DC voltage from the AC/DC converter and an external DC input supplied from the external DC power supply; a cellular network interface being connected to the DC voltage regulator and configured to establish a first network connection to a cellular network; an Ethernet interface being connected to the DC voltage regulator and configured to establish a second network connection to an existing network or share the first network with the cellular network; and a wireless network being connected to the cellular network interface and the Ethernet interface and configured to share the first network connection with the cellular network interface or share the second network connection with the Ethernet interface.

The power WiFi device may further include a USB charging module being connected to the DC voltage regulator and configured to charge USB devices. The USB charging module may include two data pins, and the voltages on the two data pins may be programmable so as to fit a specific charging profile.

The power WiFi device may further include a rechargeable battery module and a device controller. The rechargeable battery module may be connected to the DC voltage regulator and configured to be recharged by an output voltage of the DC voltage regulator and to input a battery DC voltage to the DC voltage regulator. The device controller may be connected to the DC voltage regulator and configured to give higher precedence to the AC power supply than the external DC power supply, and give higher precedence to the external DC power supply than the rechargeable battery module in choosing a power source to power the power WiFi device.

BRIEF DESCRIPTIONS OF THE DRAWINGS

DETAILED DESCRIPTION

Reference will now be made in detail to a preferred embodiment of the power WiFi device disclosed in the present patent application, examples of which are also provided in the following description. Exemplary embodiments of the power WiFi device disclosed in the present patent application are described in detail, although it will be apparent to those skilled in the relevant art that some features that are not particularly important to an understanding of the power WiFi device may not be shown for the sake of clarity.

Furthermore, it should be understood that the power WiFi device disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
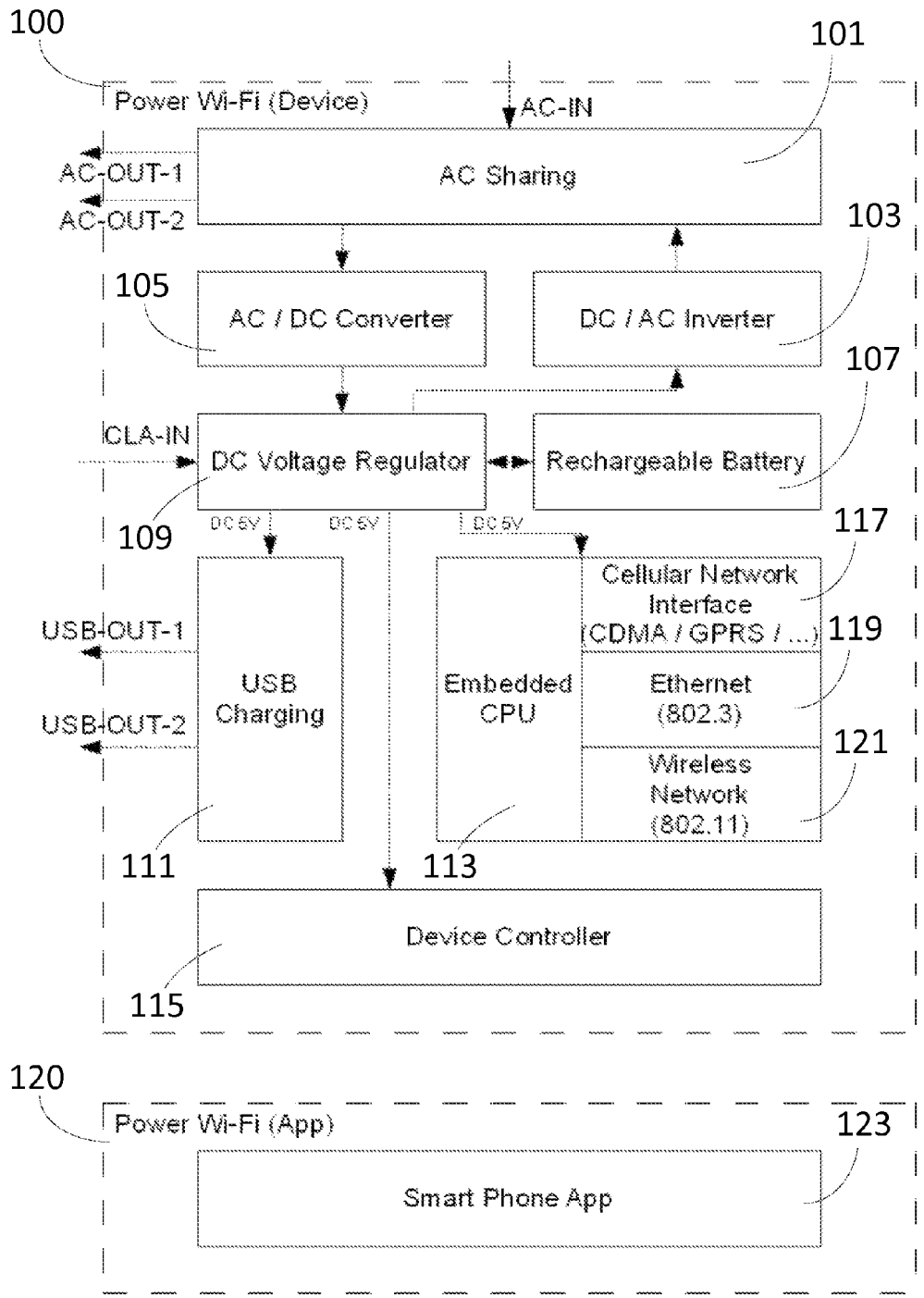
FIG. 1 is a block diagram of a power WiFi device according to an embodiment of the present patent application.

FIG. 1 is a block diagram of a power WiFi device according to an embodiment of the present patent application. Referring to FIG. 1, the power WiFi device 100 includes an AC sharing module 101, a DC/AC inverter 103, an AC/DC converter 105, a rechargeable battery module 107, a DC voltage regulator 109, a USB charging module 111, an embedded CPU module 113, a cellular network interface 117, an Ethernet interface 119, a wireless network 121, and a device controller 115. FIG. 1 also illustrates a power WiFi application 120 that is configured to run on the power WiFi device 100, and the power WiFi application 120 includes a smart phone application 123.

The AC sharing module 101 is configured to receive an AC input, AC-IN, from an AC power supply, which is typically 110V or 240V, and distribute the power to built-in AC outlets AC-OUT-1 and AC-OUT2. It is understood that the number of the AC outlets in sharing may be more than two. The AC outlets are application enabled to control functionality via relays. The AC/DC converter 105 is configured to convert the AC input to a DC voltage. The DC power is regulated to the proper DC voltage by means of the DC voltage regulator 109. The DC/AC inverter 103 is configured to take in standard cigarette lighter receptacle DC voltage CLA-IN, convert the DC voltage to an AC voltage, and feed the AC voltage to the AC sharing module 101 to be distributed through the built-in AC outlets AC-OUT-1 and AC-OUT-2. The outlets and the inverter's functionalities are application enabled and controlled via relays. The DC voltage regulator 109 is configured to take input from either the AC/DC converter 105 or CLA-IN, and regulate the DC voltages to appropriate a DC voltage for consumption. In this embodiment, the DC voltage may be used for USB charging by the USB charging module 111 or charging the rechargeable battery module 107. When the power WiFi device 100 is not connected to an external AC outlet, the rechargeable battery module 107, which preferably is a rechargeable Li-Ion battery, is configured to provide power for USB charging, or to the AC-OUT-1, AC-OUT-2 outlets through the DC voltage regulator 109 (by providing a DC voltage to the DC voltage regulator 109) and the DC/AC inverter 103. The USB charging module 111 is configured to receive a voltage input from the DC voltage regulator 109 and provide a USB 5V DC to the Vcc/ground pins for charging USB devices. The two USB data pins (pins 2 and pins 3 or D⁻ and D⁺, respectively) are manipulated, i.e. programmed, so that the power WiFi device 100 can provide a charging profile that fits the specific need of the USB devices being charged.

In this embodiment, the network router and bridging firmware runs on the embedded CPU 113. The embedded CPU 113 is connected to the DC voltage regulator 109 and configured to run the power WiFi application that dictates the operation of the power WiFi device 100.

The cellular network interface 117, being connected to the DC voltage regulator and configured to establish a network connection to a cellular network, includes a built-in SIM slot. If a user places a commodity SIM card in the built-in SIM slot, the device can be connected to the Internet via the data network provided by the cellular carrier. This connection can then be shared locally to the wireless network 121, thus enabling the power WiFi device 100 to operate like a MiFi ("My WiFi") device. In this embodiment, the Ethernet interface 119 and the wireless network 121 are both connected to the cellular network interface 117, and configured to share a network connection to a cellular network established by the cellular network interface 117. The wireless network 121 is the key network sharing medium the power WiFi device 100 provides. The smart phone application 123 may be stored on a smartphone, and the smartphone may communicate with the power WiFi device 100 via this medium. It is understood that in an alternative embodiment, a network connection to an existing network, for example, the Internet, may be established by the Ethernet interface 119 and shared through the wireless network 121. In this embodiment, the wireless network 121 is connected to the cellular network interface 117 and the Ethernet interface 119, and configured to share the network connection to the cellular network with the cellular network interface 117 or share the network connection established by the Ethernet interface 119 with the Ethernet interface 119.

The device controller 115, being connected to the DC voltage regulator 109, is the interconnecting mechanism that links the various modules inside the power WiFi device 100 together and configured to provide control for the power WiFi device 100, and to execute all the user inputs to the phone application 123. The mechanism also includes a plurality of switches and LEDs for providing basic control functions. The interaction between the device controller 115 and the various modules is described in more detail with FIG. 2 and Table 1.

The smart phone application 123 is configured to provide an easy to use graphical user interface for controlling the key features of power WiFi device. As aforementioned, the smart phone application 123 may be stored on a smartphone, and the smartphone may communicate with the power WiFi device 100 via the wireless network 121.

Figure 2:
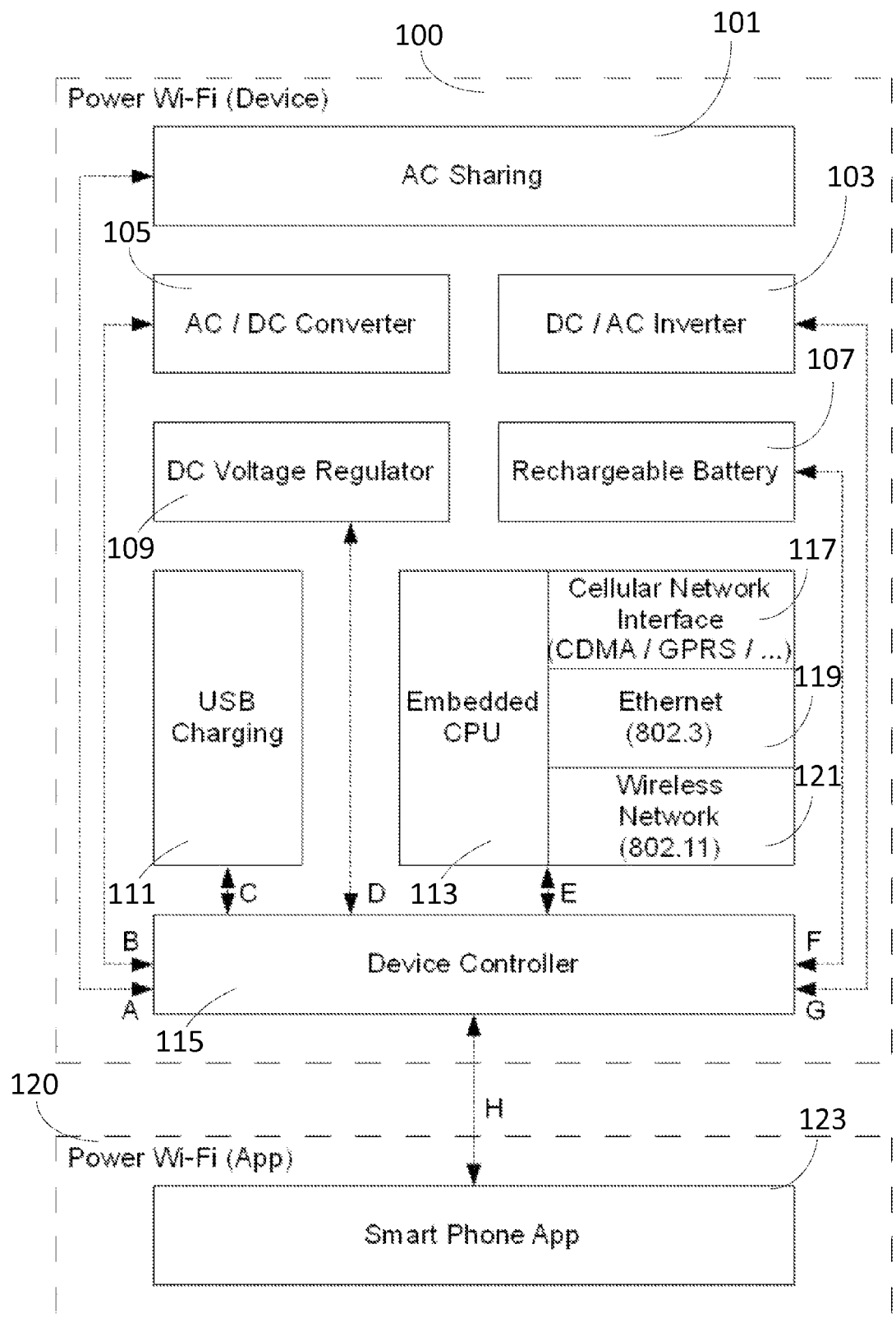
FIG. 2 illustrates a data signal flow between the components of the power WiFi device depicted in FIG. 1.

FIG. 2 illustrates a data signal flow between the components of the power WiFi device depicted in FIG. 1. Table 1 gives a description of the signals shown in FIG. 2.

TABLE 1

| Signal | Relevant Modules | | Read | Write | Description |
|---|---|---|---|---|---|
| A | AC Sharing Module 101 | Device Controller 115 | X | | Is AC-IN connected? |
| | | | X | | Is AC-OUT-1/ AC-OUT-2 connected? |
| | | | | X | ON/OFF of AC-OUT-1/AC-OUT-2 |
| | | | X | X | Current (A) and voltage (V) of AC outlet AC-OUT-1/AC-OUT-2 |
| B | AC/DC Converter 105 | Device Controller 115 | X | | Input voltage (V) of AC-IN (110 V vs. 240 V) |
| C | USB Charging Module 111 | Device Controller 115 | X | | Is USB-OUT-1/ USB-OUT-2 connected? |
| | | | X | X | Current (A) of USB connector USB-OUT-1/ USB-OUT-2 |
| | | | X | | Device type of USB device connected to USB-OUT-1/ USB-OUT-2 |
| D | DC Voltage Regulator 109 | Device Controller 115 | X | | Is CLA-IN connected? |
| | | | X | | Input current (A) and voltage (V) of CLA-IN |
| E | Embedded CPU (Network) 113 | Device Controller 115 | X | | Is there a Cellular Network Interface (a SIM card)? |
| | | | X | | Is RJ-45 connected? |
| | | | X | | Is wireless connected? |
| | | | X | | Is the device successfully connected to the Internet? |
| | | | X | | Number of wireless clients connected |
| | | | X | | Signal strength of 802.11 Xmt/ Recv signal |
| | | | X | X | Encryption type of the WiFi network (WEP2, WEP, etc) |
| | | | X | X | SSID and password of the WiFi network |
| | | | X | X | All standard network configuration related parameters |
| F | Rechargeable Battery Module 107 | Device Controller 115 | X | | Is battery connected? |
| | | | X | | Is battery charging? |
| | | | X | | Current capacity of rechargeable battery |
| G | DC/AC Inverter 103 | Device Controller 115 | X | | Is the inverter operating properly? |
| H | Smart Phone Application 123 | Device Controller 115 | | | All signals passed between various modules in the power Wi-Fi device will be passed to the Smart Phone App. |

The power WiFi device 100 can be powered via AC voltage power (120VAC-250VAC) found primarily on household or commercial wall outlets worldwide. Alternatively, in this embodiment, the power WiFi device 100 can be powered with DC voltage power via two options: +12VDC input found commonly from automobile power supply ports or the rechargeable battery 107. All incoming power is monitored by the application 120 for power consumption, the monitored parameters including incoming voltage, current draw, power usage and charge state (when on battery power). The power WiFi device 100 defaults to using AC voltage supply. If AC power is not available then the power WiFi device will obtain input power via DC input either using +12 VDC power or battery power. Battery power has the lowest precedence for powering the power WiFi device. When the AC power is restored to the power WiFi device, the connected battery 107 goes into recharge mode until 100% fully recharged. It is understood that the power WiFi device 100 may be powered by a DC input from an external detachable power supply, such as a cigarette lighter.

The power WiFi device 100 is configured to serve as a power tap and conduct high power USB charging power management. The power WiFi device 100 includes two, or more, power tap outlets providing either 120VAC-250VAC. In this embodiment, the power tap outlets are providing voltages AC-OUT-1 and AC-OUT-2. The user can enable, or disable, each power tap outlet via application controlled high voltage relays. If the power WiFi device 100 is DC powered, then the application controlled inverter 103 is utilized to provide AC voltage to the power tap outlets. No matter what type of input power is provided for the power WiFi device 100, the power WiFi device can always provide 120 VAC or 250 VAC to its power tap outlets. Power distribution for the AC-mains can be turned ON or OFF via phone application or software control.

The power WiFi device 100 is configured to provide high-power, smart, USB charging with application control through the USB charging module. In this embodiment, the charging power is 10 Watts or more, and the DC charging voltage is +5 VDC, which is the nominal USB specified voltage. The power WiFi device 100 is capable of charging mobile devices requiring as little as 500 mA, such as a typical USB device, and devices requiring higher power such as an iPad that requires over 2000 mA. The power WiFi device 100 may contain one or more high power USB charging ports, such as USB-OUT-1 and USB-OUT-2 in this embodiment. The USB charging module 111 is configured to utilize the USB data pins to enable the user, via application control, to charge any USB capable device. For example, in the case of old Motorola mobile phones with USB charging, the phones require a certain resistor value on the USB data pins in order for the phone electronics to charge the mobile phone battery. The USB data pins' resistor values can be altered via an electronic resistor network or voltage pulse width modulation.

The power WiFi application 120 is configured to control and maintain WiFi connectivity via Ethernet port (RJ45) or using a 3G or higher, mobile SIM card. The Power WiFi device 100 is configured to provide secure or unsecure WiFi connectivity. All WiFi connectivity functions are all application controlled such as setting network name, WPA/WPA2 security, connection settings, upload and download speeds, and etc. It is understood that the power WiFi application is also configured to manage USB smart charging, AC Mains Outlet Activation, power WiFi device status and control, system shutdown and etc.

Figure 3:
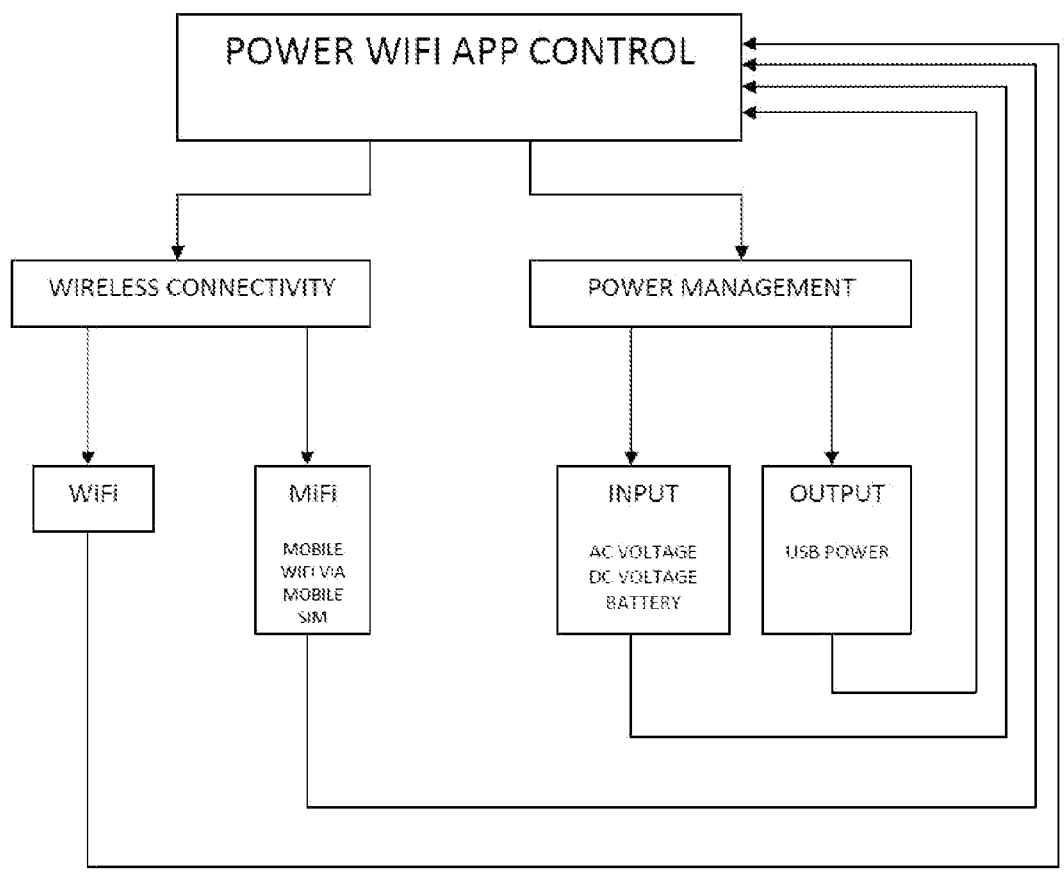
FIG. 3 is a block diagram illustrating an overall control flow of the power WiFi device depicted in FIG. 1.

FIG. 3 is a block diagram illustrating an overall control flow of the power WiFi device depicted in FIG. 1. FIG. 3 shows the over-arching "simplistic" operation of the power WiFi device 100. It illustrates how the smart phone application 120 reads and writes. FIG. 3 also illustrates the two main functions of the power WiFi device 100 as basically being to control the wireless connectivity and to control the power management segments.

Figure 4:
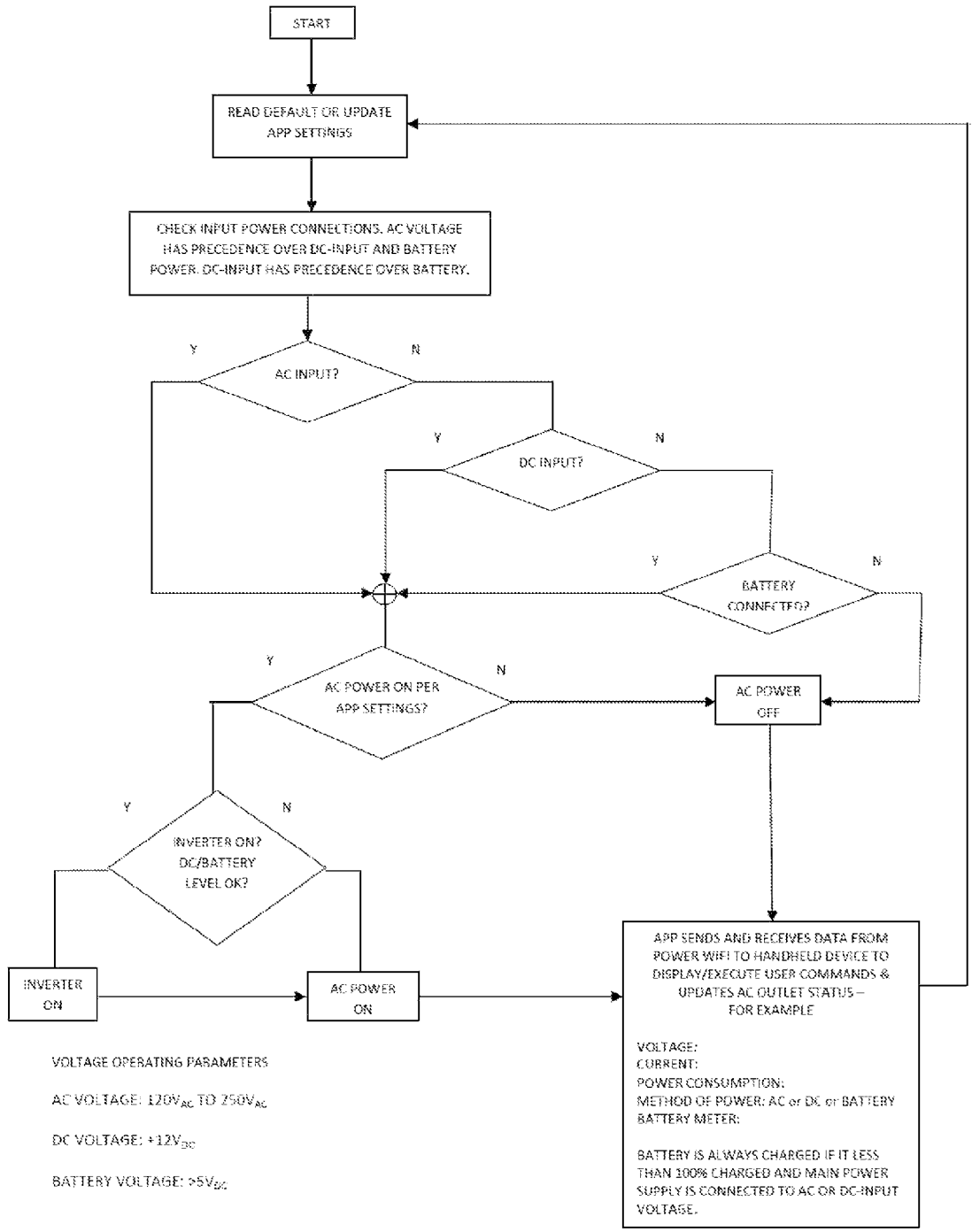
FIG. 4 is a flow chart illustrating a power management process of the power WiFi device depicted in FIG. 1.

FIG. 4 is a flow chart illustrating a power management process of the power WiFi device depicted in FIG. 1. Referring to FIG. 4, the process includes: reading default or update application settings; checking the input power connections, AC input having precedence over DC input and battery power, DC input having precedence over battery power; if any one of AC input, DC input or battery power is on, and AC power is on according to an application settings, then setting the output AC power on; if all of AC input, DC input or battery power are off, or AC power is on not according to the application settings, then setting the output AC power off; and the application sending and receiving data from the power WiFi device to a handheld device to display/execute user commands and updating AC outlet status. The process further includes before setting the AC power on, determining whether the DC/AC inverter should be turned on and the DC or battery level is correct; if yes, turning on the DC/AC inverter; and if no, setting the AC power on without turning on the DC/AC inverter.

Figure 5:
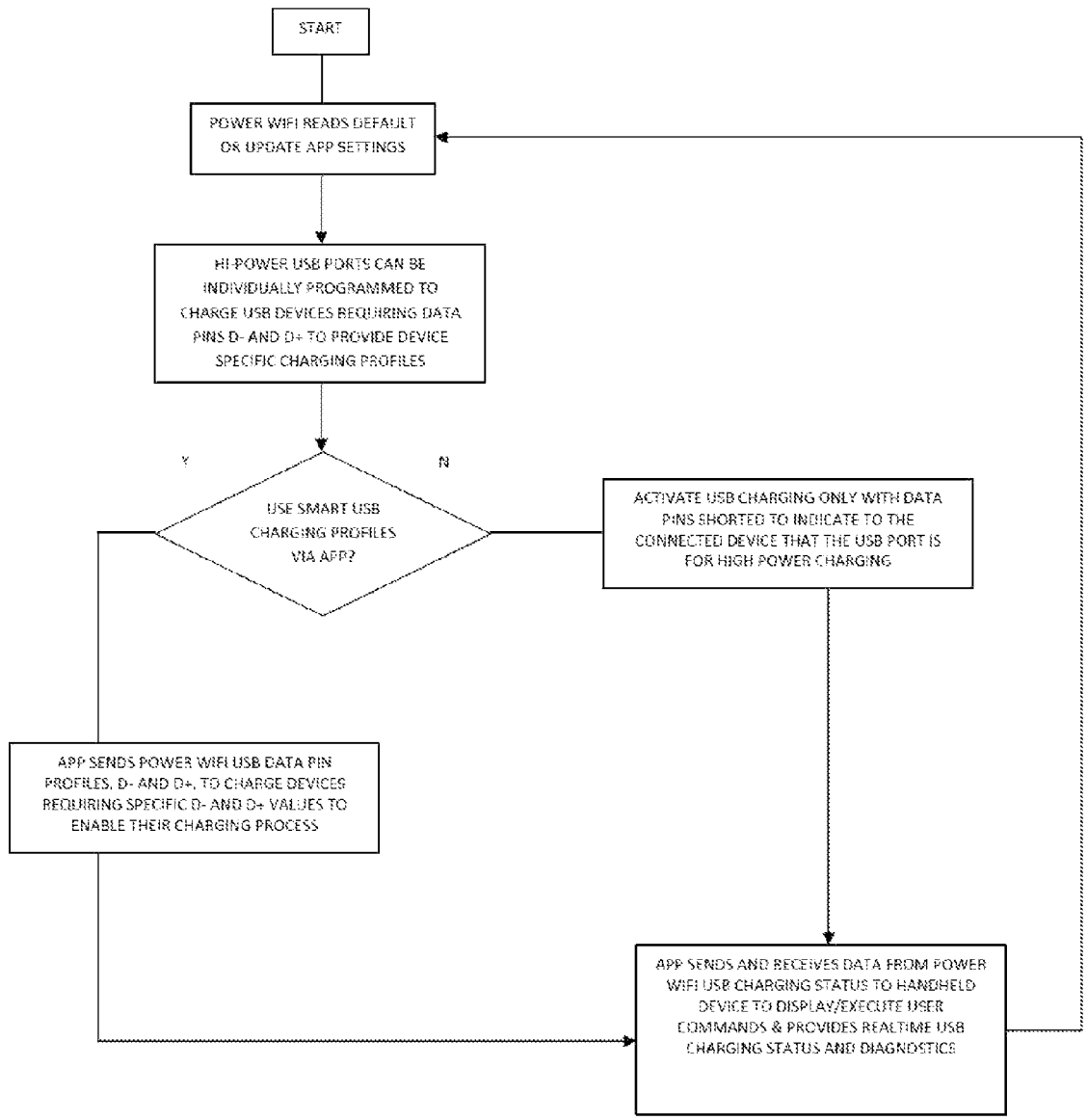
FIG. 5 is a flow chart illustrating a high power smart USB charging process of the power WiFi device depicted in FIG. 1.

FIG. 5 is a flow chart illustrating a USB charging process of the power WiFi device depicted in FIG. 1. Referring to FIG. 5, the process includes: power WiFi device reading default settings or updating application settings; individually programming the high power USB ports to charge USB devices requiring data pins D− and D+ to provide device specific charging profiles; if smart USB charging profiles are to be used via an application, the application sending power WiFi USB data pin profiles, D− and D+, to charge devices requiring specific D− and D+ values to enable their charging process; if smart USB charging profiles are not to be used via an application, activating USB charging only with data pins shorted to indicate to the connected device that the USB port is for high power charging; and the application sending the receiving data from the power WiFi USB charging status to handheld device to display/execute user commands and providing real time USB charging status and diagnostics.

Figure 6:
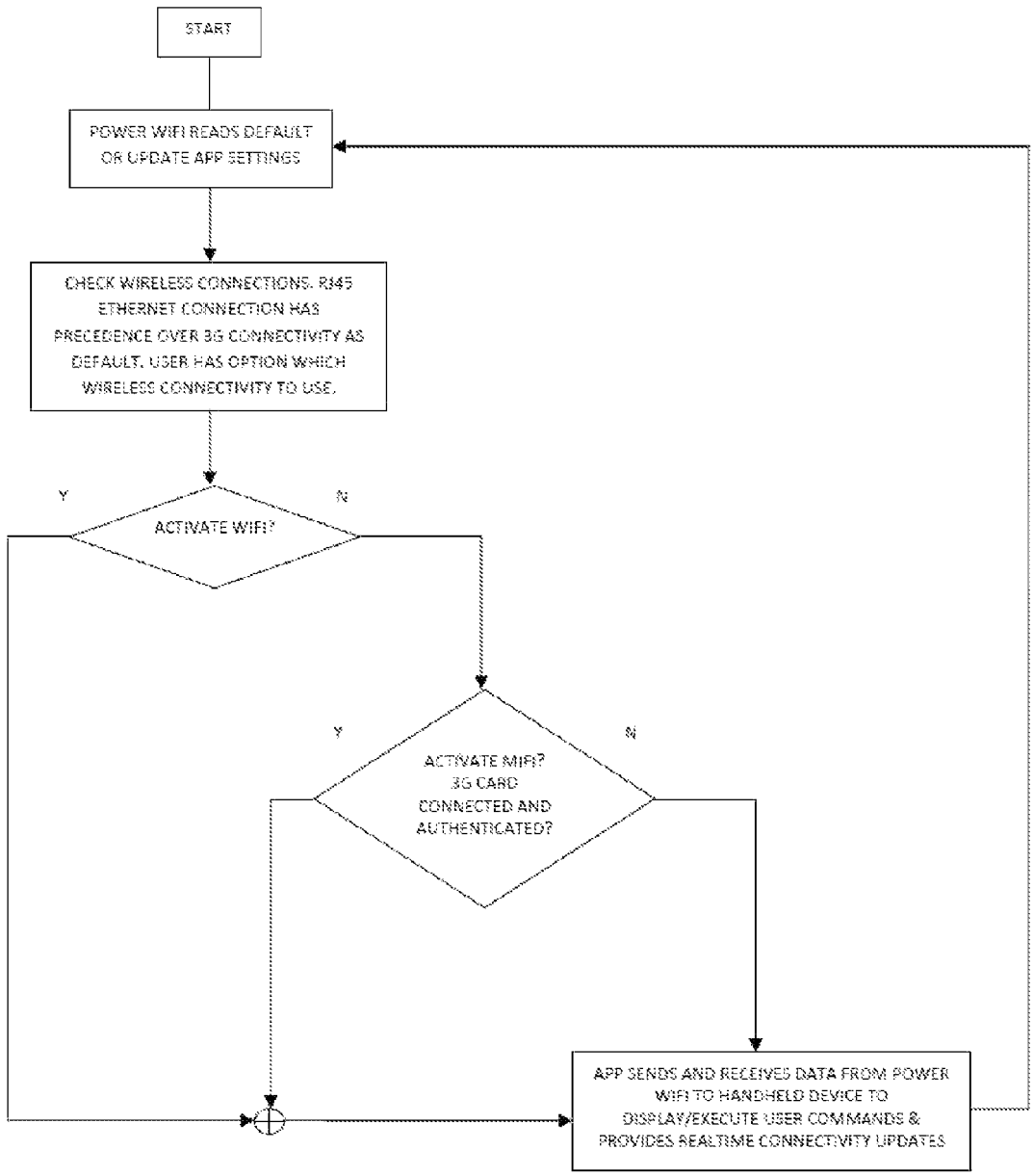
FIG. 6 is a flow chart illustrating a wireless connectivity management process of the power WiFi device depicted in FIG. 1.

FIG. 6 is a flow chart illustrating a wireless connectivity management process of the power WiFi device depicted in FIG. 1. Referring to FIG. 6, the process includes: power WiFi device reading default settings or update application settings; check wireless connections, RJ45 Ethernet connection having precedence over 3G connectivity as default, the user having an option about which wireless connectivity to use; activating WiFi or MiFi (standing for "My WiFi") if necessary; and an application sending and receiving data from the power WiFi device to a handheld device to display/execute user commands and providing real time connectivity updates. The process also includes checking whether the 3G card is connected and authenticated before activating MiFi.

The power WiFi device as provided in the above embodiments is the modern "Swiss army knife" for the world or business traveler. The featured benefit of the power WiFi device is that the user has primary control of the device via, but not limited to, mobile application driven software. For example, the software application may be compatible with Apple's iOS or Android software platforms. The power WiFi device provides a mobile solution for power management and WiFi connectivity utilizing application control for the person "on the go". It can be used just about everywhere, for example, on a plane, in a car, on a train, at home, in a hotel, and etc.

While the present patent application has been shown and described with particular references to a number of embodiments thereof, it should be noted that various other changes or modifications may be made without departing from the scope of the present invention.

What is claimed is:

1. A power WiFi device configured for running an application, the power WiFi device comprising:
the power WiFi application configured to control:
an AC sharing module, the AC sharing module comprising a plurality of AC outlets and being configured to receive an AC input from an AC power supply and distribute the power through the AC outlets;
an AC/DC converter being connected to the AC sharing module and configured to convert the AC input to an DC voltage;
a DC voltage regulator being connected to the AC/DC converter and an external DC power supply, and being configured to regulate the DC voltage from the AC/DC converter and an external DC input supplied from the external DC power supply;
a cellular network interface being connected to the DC voltage regulator and configured to establish a network connection to a cellular network;
an Ethernet interface being connected to the cellular network interface and configured to share the network connection; and
a wireless network being connected to the cellular network interface and configured to share the network connection.

2. The power WiFi device of claim 1 further comprising a DC/AC inverter being connected to the AC sharing module and the DC voltage regulator, and configured to convert an output of the DC voltage regulator to an AC voltage and to feed the AC voltage to the AC sharing module to be distributed through the AC outlets, wherein the AC sharing module is configured to receive AC voltage input of multiple values.

3. The power WiFi device of claim 1 further comprising a rechargeable battery module being connected to the DC voltage regulator, and configured to be recharged by an output voltage of the DC voltage regulator and to input a battery DC voltage to the DC voltage regulator, wherein the external DC power supply is a cigarette lighter and the external DC input is a standard cigarette lighter receptacle DC voltage.

4. The power WiFi device of claim 1 further comprising a USB charging module being connected to the DC voltage regulator and configured to charge USB devices, wherein the USB charging module comprises two data pins and the voltages on the two data pins are programmable so as to fit a specific charging profile.

5. The power WiFi device of claim 4, wherein the resistor values on the two data pins are altered via an electronic resistor network or voltage pulse width modulation.

6. The power WiFi device of claim 4, wherein the data pins are shorted so as to indicate to a device connected to the USB charging module that the USB charging module is for high power charging.

7. The power WiFi device of claim 1 further comprising an embedded CPU module being connected to the DC voltage regulator and configured to run the application, wherein the wireless network is configured to function as a medium for the power WiFi device to communicate with a handheld device that stores the application.

8. The power WiFi device of claim 3 further comprising a device controller being connected to the DC voltage regulator and configured to provide control for the power WiFi device, wherein the device controller comprises a plurality of switches and LEDs.

9. The power WiFi device of claim 1, wherein the plurality of AC outlets of the AC sharing module are configured to output different AC voltages.

10. The power WiFi device of claim 8, wherein in choosing a power source to power the power WiFi device, the device controller is configured to give higher precedence to the AC power supply than the external DC power supply, and give higher precedence to the external DC power supply than the rechargeable battery module.

11. The power WiFi device of claim 10, wherein if the rechargeable battery module is used to power the WiFi device when the AC input is not available, when the AC input is available, the rechargeable battery module is configured to be recharged by the output voltage of the DC voltage regulator until the rechargeable battery module is fully recharged.

12. A power WiFi device configured for running an application, the power WiFi device comprising:
the power WiFi application configured to control:
an AC sharing module, the AC sharing module comprising a plurality of AC outlets and being configured to receive an AC input from an AC power supply and distribute the power through the AC outlets;
an AC/DC converter being connected to the AC sharing module and configured to convert the AC input to an DC voltage;
a DC voltage regulator being connected to the AC/DC converter and an external DC power supply, and being configured to regulate the DC voltage from the AC/DC converter and an external DC input supplied from the external DC power supply;
a cellular network interface being connected to the DC voltage regulator and configured to establish a first network connection to a cellular network;
an Ethernet interface being connected to the DC voltage regulator and configured to establish a second network connection to an existing network; and
a wireless network being connected to the cellular network interface and the Ethernet interface and configured to share the first network connection with the cellular network interface or share the second network connection with the Ethernet interface.

13. The power WiFi device of claim 12, wherein when both the first network connection and the second network connection are available, the wireless network is configured to share the second network connection with the Ethernet interface.

14. The power WiFi device of claim 12 further comprising a rechargeable battery module and a device controller, wherein the rechargeable battery module is connected to the DC voltage regulator and configured to be recharged by an output voltage of the DC voltage regulator and to input a battery DC voltage to the DC voltage regulator; and the device controller is connected to the DC voltage regulator and configured to give higher precedence to the AC power supply than the external DC power supply, and give higher precedence to the external DC power supply than the rechargeable battery module in choosing a power source to power the power WiFi device.

15. The power WiFi device of claim 14, wherein if the rechargeable battery module is used to power the WiFi device when the AC input is not available, when the AC input is available, the rechargeable battery module is configured to be recharged by the output voltage of the DC voltage regulator until the rechargeable battery module is fully recharged.

16. The power WiFi device of claim 12 further comprising a USB charging module being connected to the DC voltage regulator and configured to charge USB devices, wherein the USB charging module comprises two data pins and the voltages on the two data pins are programmable so as to fit a specific charging profile.

17. The power WiFi device of claim 12, wherein the wireless network is configured to function as a medium for the power WiFi device to communicate with a handheld device that stores the application.

18. A power WiFi device configured for running an application, the power WiFi device comprising:
the power WiFi application configured to control:
an AC sharing module, the AC sharing module comprising a plurality of AC outlets and being configured to receive an AC input from an AC power supply and distribute the power through the AC outlets;
an AC/DC converter being connected to the AC sharing module and configured to convert the AC input to an DC voltage;
a DC voltage regulator being connected to the AC/DC converter and an external DC power supply, and being configured to regulate the DC voltage from the AC/DC converter and an external DC input supplied from the external DC power supply;
a cellular network interface being connected to the DC voltage regulator and configured to establish a first network connection to a cellular network;
an Ethernet interface being connected to the DC voltage regulator and configured to establish a second network connection to an existing network or share the first network with the cellular network; and
a wireless network being connected to the cellular network interface and the Ethernet interface and configured to share the first network connection with the cellular network interface or share the second network connection with the Ethernet interface.

19. The power WiFi device of claim 18 further comprising a USB charging module being connected to the DC voltage regulator and configured to charge USB devices, wherein the USB charging module comprises two data pins, and the voltages on the two data pins are programmable so as to fit a specific charging profile.

20. The power WiFi device of claim 18 further comprising a rechargeable battery module and a device controller, wherein the rechargeable battery module is connected to the DC voltage regulator and configured to be recharged by an output voltage of the DC voltage regulator and to input a battery DC voltage to the DC voltage regulator; and the device controller is connected to the DC voltage regulator and configured to give higher precedence to the AC power supply than the external DC power supply, and give higher precedence to the external DC power supply than the rechargeable battery module in choosing a power source to power the power WiFi device.

* * * * *